United States Patent
Wang et al.

(10) Patent No.: US 9,823,835 B2
(45) Date of Patent: Nov. 21, 2017

(54) CONTROLLING DISPLAY OBJECT ON DISPLAY SCREEN

(71) Applicant: International Business Machines Corporation, Armonk, NY (US)

(72) Inventors: Shirley S. Wang, San Jose, CA (US); Si Wei, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 328 days.

(21) Appl. No.: 14/177,370

(22) Filed: Feb. 11, 2014

(65) Prior Publication Data
US 2014/0245209 A1    Aug. 28, 2014

(30) Foreign Application Priority Data
Feb. 28, 2013  (CN) .......................... 2013 1 0063965

(51) Int. Cl.
| | | |
|---|---|---|
| G06F 3/048 | (2013.01) | |
| G06F 3/0488 | (2013.01) | |
| G06F 3/0481 | (2013.01) | |
| G06F 3/01 | (2006.01) | |

(52) U.S. Cl.
CPC .......... *G06F 3/0488* (2013.01); *G06F 3/0481* (2013.01); *G06F 2203/04806* (2013.01)

(58) Field of Classification Search
CPC ...... G06F 8/34; G06F 3/0481; G06F 3/04847; G05B 19/0426; G05B 2219/23258
See application file for complete search history.

(56) References Cited

U.S. PATENT DOCUMENTS

| | | |
|---|---|---|
| 7,698,653 B2 | 4/2010 | Roman et al. |
| 8,225,225 B2 | 7/2012 | Jetha et al. |

(Continued)

FOREIGN PATENT DOCUMENTS

| | | |
|---|---|---|
| CN | 101526953 | 9/2009 |
| CN | 101720459 | 6/2010 |

(Continued)

OTHER PUBLICATIONS

Carpendale et al., A Framework for Unifying Presentation Space, copyright ACM 2001 1-58113-438-x/01/11, pp. 61-70, Nov. 11-14, 2001.

(Continued)

*Primary Examiner* — Nicholas Augustine
(74) *Attorney, Agent, or Firm* — Schmeiser, Olsen & Watts, LLP; John Pivnichny (57) ABSTRACT

A method and associated system for modifying an image on a display screen. A first point and a second point in the image are received from a first interaction and a second interaction, respectively, between a user and the display screen. It is ascertained that a first line and a second line in the image respectively pass through the first point and the second point in the image. The first line and the second line divide the image into a first area, a second area, and a strip area between the first area and the second area. Hiding a portion of the strip area is performed by either removing the visibility of the strip area from the display screen or displaying the portion of the strip area on the display screen in lower resolution than before the hiding is performed.

20 Claims, 7 Drawing Sheets

(56) References Cited

U.S. PATENT DOCUMENTS

| | | | |
|---|---|---|---|
| 2005/0149856 A1* | 7/2005 | Rimas | G06F 17/2294 715/243 |
| 2006/0192780 A1 | 8/2006 | Lantin | |
| 2009/0022394 A1* | 1/2009 | Banerjee | G06F 3/04845 382/164 |
| 2010/0262907 A1 | 10/2010 | Shoemaker et al. | |
| 2010/0281384 A1* | 11/2010 | Lyons | G06F 3/048 715/723 |
| 2011/0007094 A1* | 1/2011 | Nash | G06F 17/30244 345/634 |
| 2011/0055773 A1* | 3/2011 | Agarawala | G06F 3/016 715/863 |
| 2011/0078560 A1* | 3/2011 | Weeldreyer | G06F 17/214 715/255 |
| 2012/0117506 A1* | 5/2012 | Koch | G06F 3/04886 715/773 |
| 2012/0200606 A1 | 8/2012 | Jetha et al. | |
| 2012/0314924 A1* | 12/2012 | Carlton | G06F 19/321 382/131 |
| 2012/0320169 A1* | 12/2012 | Bathiche | G06F 3/011 348/53 |
| 2013/0016122 A1* | 1/2013 | Bhatt | G06F 3/04845 345/620 |
| 2013/0236093 A1* | 9/2013 | Gatt | G06F 3/0484 382/167 |
| 2013/0239056 A1* | 9/2013 | Ubillos | G06T 11/60 715/833 |
| 2013/0278507 A1* | 10/2013 | Hintermeister | G06F 3/04883 345/173 |
| 2016/0188181 A1* | 6/2016 | Smith | G06F 3/048 715/765 |

FOREIGN PATENT DOCUMENTS

| | | |
|---|---|---|
| CN | 101751660 | 6/2010 |
| CN | 102868928 | 1/2013 |

OTHER PUBLICATIONS

Office Action IDS; Office Action dated Sep. 26, 2016, 2 pages.
Office Action; Office Action dated Sep. 26, 2016, 4 pages.

* cited by examiner

CONTROLLING DISPLAY OBJECT ON DISPLAY SCREEN

TECHNICAL FIELD

The present invention relates to display control, and more specifically, to a method and system for controlling a display object on a display screen.

BACKGROUND

Display technology is one of significant aspects of computer technology. Devices such as displays, touch screens, projectors or the like have become core output devices for providing visual content to users. With the development of computer hardware technology, the integration and resolution of display devices get increasingly high, and in the meanwhile, the size becomes much smaller and display devices can be more easily combined with portable computer devices. This enables users to experience better display effect on portable computer devices.

In addition, with the constant evolution of various applications running on computer devices, formats of display content as provided to users by various applications become increasingly complicated, while the data amount of display content gets larger and larger. As a result, the following demands might exist when providing display content to users. For example, a map application usually involves large amounts of map data, while users desire to more efficiently display map data on a rather limited display screen (e.g., 800×600 pixels) of a portable computer device. For another example, when a user viewing a photo might desire to compare two figures on the left and right sides of the photo with a higher resolution and also desire to hide other image content between the two figures, etc.

Therefore, it becomes a hot issue of research as to how to more efficiently display on a display device (especially the display of a portable computer device whose display screen is in a limited size) data outputted by an application.

BRIEF SUMMARY

The present invention provides a method and associated system for modifying display of an image on a display screen. The method comprises:

receiving, by one or more processors of a computer system, from a first interaction between a user and the display screen, a first point in the image on the display screen;

receiving, by the one or more processors from a second interaction between the user and the display screen, a second point in the image on the display screen;

ascertaining, by the one or more processors, a first line and a second line in the image respectively passing through the first point and the second point in the image, wherein the first line and the second line divide the image into a first area, a strip area, and a second area, wherein the first area is in direct physical contact with the strip area along the first line, wherein the second area is in direct physical contact with the strip area along the second line, wherein the strip area is disposed between, and in direct physical contact with, the first line and the second line, and wherein the first area, the strip area, and the second area, are being visibly displayed on the display screen; and after said ascertaining, hiding, by the one or more processors, a portion of the strip area, wherein said hiding comprises either removing the visibility of the strip area from the display screen or displaying the portion of the strip area on the display screen in lower resolution than before said hiding is performed.

BRIEF DESCRIPTION OF THE DRAWINGS

Through the more detailed description of some embodiments of the present disclosure in the accompanying drawings, the above and other objects, features and advantages of the present disclosure will become more apparent. Several embodiments of the present invention are illustrated schematically instead of in a limited manner.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The present invention provides a technical solution capable of supporting the control of a display object on a display screen, and it is desired that the technical solution can output an area of interest to a user on the display screen and support the user to adjust to-be-displayed/to-be-hidden content at any time through simple operations. To this end, various embodiments of the present invention provide a method and apparatus for controlling a display object on a display screen.

According to one aspect of the present invention, there is provided a method for controlling a display object on a display screen, comprising: receiving a first interaction between a user and the display screen, wherein a first initial interaction point of the first interaction on the display screen corresponds to a first location in the display object; receiving a second interaction between the user and the display screen, wherein a second initial interaction point of the second interaction on the display screen corresponds to a second location in the display object; and hiding a portion between the first location and the second location in the display object; wherein the portion is defined by a first boundary through the first location, a second boundary through the second location and a boundary of the display object.

According to one aspect of the present invention, the hiding a portion between the first location and the second location in the display object comprises: calculating a direction between the first location and the second location; determining the first boundary and the second boundary based on the direction; and hiding a strip between the first boundary and the second boundary in the display object.

In one embodiment of the present invention, the hiding a strip between the first boundary and the second boundary in the display object comprises: translating portions outside the strip in the display object so as to cover the strip.

According to one aspect of the present invention, there is provided an apparatus for controlling a display object on a display screen, comprising: a first receiving module configured to receive a first interaction between a user and the display screen, wherein a first initial interaction point of the first interaction on the display screen corresponds to a first location in the display object; a second receiving module configured to receive a second interaction between the user and the display screen, wherein a second initial interaction point of the second interaction on the display screen corresponds to a second location in the display object; and a hiding module configured to hide a portion between the first location and the second location in the display object; wherein the portion is defined by a first boundary through the first location, a second boundary through the second location and a boundary of the display object.

According to one aspect of the present invention, the hiding module further comprises: a calculating module configured to calculate a direction between the first location and the second location; a determining module configured to determine the first boundary and the second boundary based on the direction; and a strip hiding module configured to hide a strip between the first boundary and the second boundary in the display object.

According to one aspect of the present invention, the strip hiding module comprises: a translating module configured to translate portions outside the strip in the display object so as to cover the strip.

By means of the method and apparatus described in the various embodiments, without any additional hardware configuration, a user may be enabled to control the display object on the display screen, and further the user may conveniently and rapidly select an area of interest in the display object. In the meanwhile, the various embodiments of the present invention further reduce or avoid a large amount of operations like zoom in, zoom out and translation that were performed by the user for seeking an area of interest in the display object according to the prior art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product comprising one or more computer readable medium(s) or one or more storage devices having computer readable program code stored therein, wherein the program code contains instructions configured to be executed by one or more processors of a computer system to implement the methods of the present invention.

Any combination of one or more computer readable medium(s) or storage devices may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
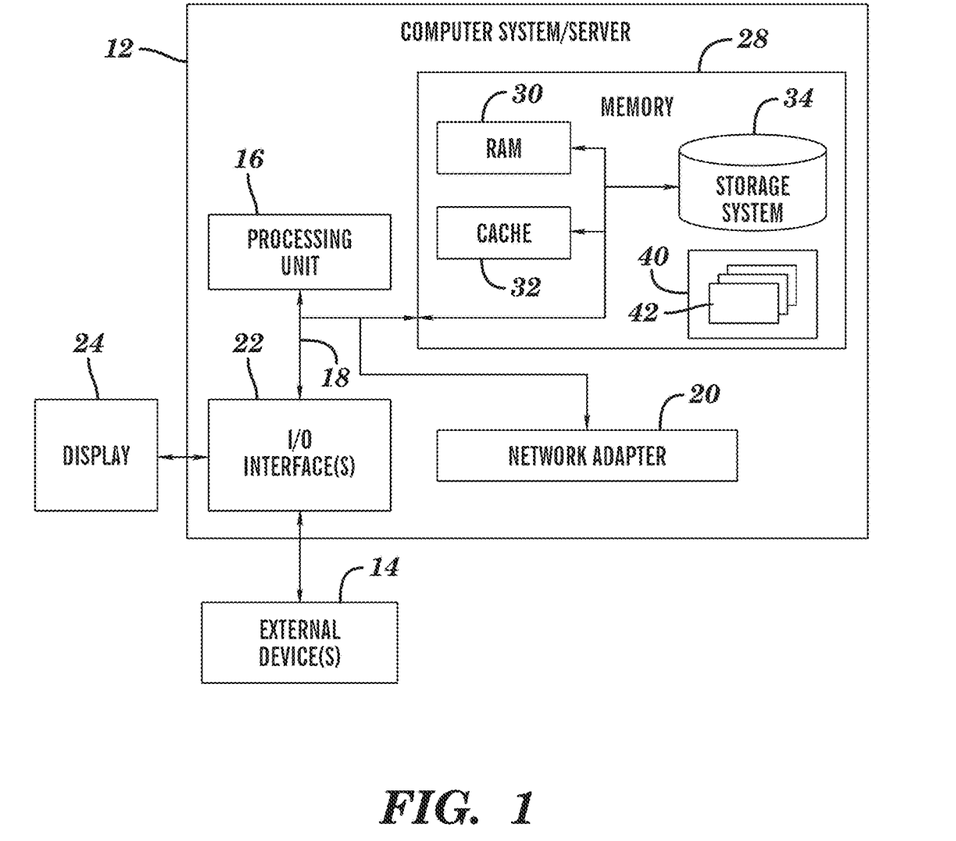
FIG. 1 illustrates an exemplary computer system/server which is applicable to implement the embodiments of the present invention.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set (for example, at least one) of program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Thus, a computer system (e.g., computer system 12) of the present invention comprises one or more processors, one or more memory units coupled to the processor, and one or more computer readable storage devices coupled to the one or more processors, wherein the one or more storage devices contain program code which, upon being executed by the one or more processors, implements the methods of the present invention.

Further note FIG. 1 just schematically illustrates an example of an exemplary computer system which is applicable to implement the embodiments of the present invention. Those skilled in the art should understand the embodiments of the present invention may further be implemented on various computer devices having display means, including without limitation tablet computers, mobile communication terminals, intelligent communication terminals, media play terminals, game terminals, personal digital assistants, terminals of the Global Satellite Positioning System, and other stationary or removable computer devices. Further note the embodiments of the present invention do not limit the type of display means, but the display means may be any output device capable of providing visual output to users, including without limitation displays, projectors, touch-screen displays, etc.

Figure 2A:
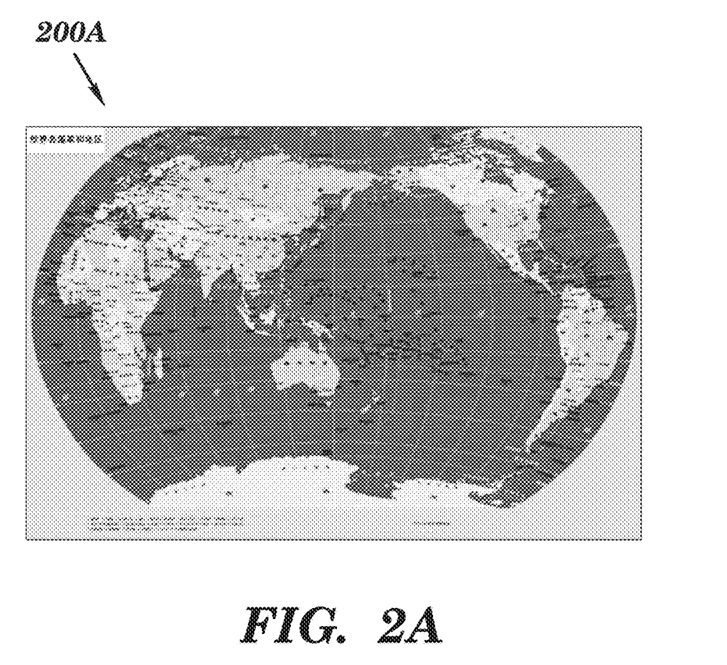
FIGS. 2A and 2B schematically illustrate schematic views of an interface for controlling a display object on a display screen according to one solution.
Figure 2B:
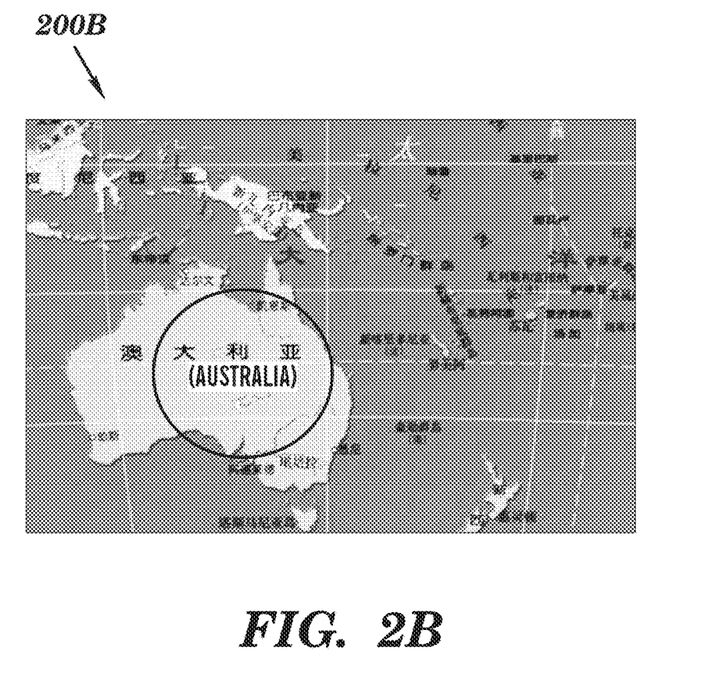

FIGS. 2A and 2B schematically illustrate schematic views 200A and 200B of an interface for controlling display objects on a display screen according to one solution, respectively. In the interface of a map application as illustrated in FIG. 2A, a complete world map can be provided to users. Although users can view the full picture of the world map, they can hardly obtain detailed information of countries/regions of interest due to the low resolution of the map.

In the interface of a map application as illustrated in FIG. 2B, users can select a country/region of interest (e.g., Australia) and zoom it out to higher resolution so as to obtain more details.

Note in the context of the embodiments of the present application, although the detailed implementation of the present application is illustrated by taking a map application as an example, the display object described in the present application is not limited to the map in a map application, but may include without limitation visual display content outputted by any application, e.g., a digital image, a vector image, an object in Portable Document Format, etc.

In the solutions illustrated in FIGS. 2A and 2B, a user can select a portion of interest in the display object and move it to the center of the display interface or zoom it out to higher resolution. However, when the user is interested in multiple portions in the map, since the multiple areas are far away from each other and cannot be simultaneously displayed in a display area with specific resolution, the user cannot simultaneously view the multiple areas in the display interface and compare them. For example, when the user desires to simultaneously display maps of America and Australia in a display area, the prior art fails to provide any feasible technical solution. At this point, the user has to view a world map including Australia and America with lower resolution (e.g., as illustrated in FIG. 2A); or with the higher resolution as illustrated in FIG. 2B, maps of Australia and America are displayed on a display one after another through repeated translation operations.

Figure 3A:
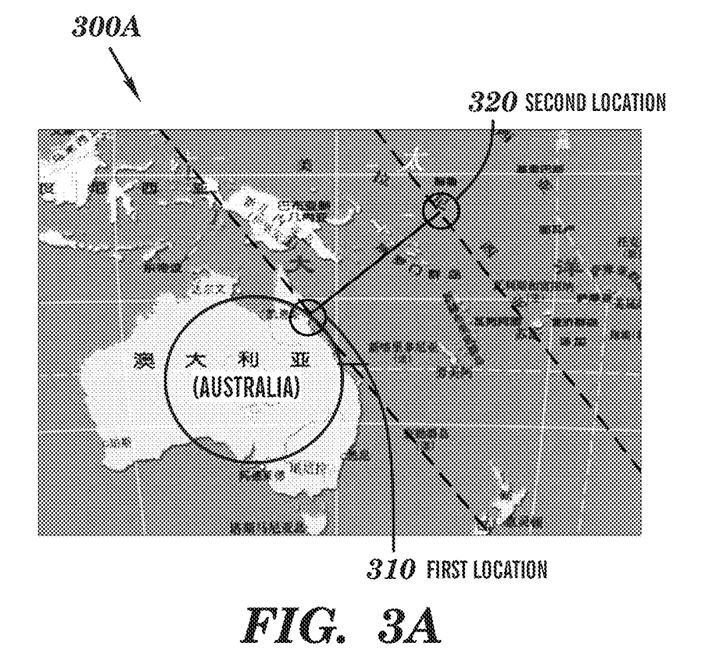
FIGS. 3A and 3B schematically illustrate schematic views of an interface for controlling a display object on a display screen according to one embodiment of the present invention.
Figure 3B:
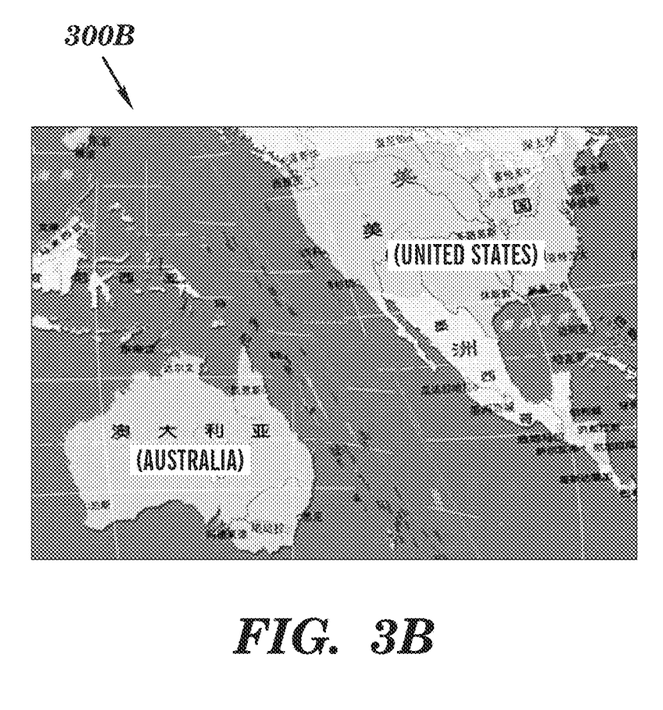

Although in some applications content like text can be hidden, when a display object is an image (e.g., a pixel image and/or a vector image) being displayed on the display screen, the complexity of image content makes it impossible to divide the display object in a horizontal and/or vertical orientation. Meanwhile, since the image content is not composed in the form of rows and/or columns, an area of interest may be an area in any shape (as illustrated in FIG. 2B, the area of interest may be the portion where Australia is located). Therefore, in the context of the present invention special consideration should be given to the impact of these factors. A display object is th In view of the foregoing drawbacks, it is desired to display areas of interest to a user with specific resolution simultaneously. To this end, the present invention provides a technical solution for controlling display objects on a display screen. FIGS. 3A and 3B schematically illustrate schematic views 300A and 300B of an interface for controlling a display object on a display screen according to one embodiment of the present invention, respectively.

For example, when the user wants to view maps of both Australia and America on a display screen, although these two countries can be simultaneously displayed using the complete world map as illustrated in FIG. 2A, such display only supports lower resolution and cannot provide details. By means of the embodiments of the present invention, the user can fold (i.e., hide) the ocean area between Australia and America and adjacently display maps of Australia and America on the display screen.

As illustrated in FIG. 3A, in one embodiment of the present invention, it is feasible that the user selects two points (e.g., a first location 310 and a second location 320) in a map and hides the portion between these two points in the map. Specifically, FIG. 3B illustrates a display interface after performing multiple "fold" operations. Note perhaps the coordinate relationship illustrated in the map at this moment is no longer accurate, whereas this embodiment enables to display at least two areas of interest in one display interface and meanwhile ignore areas of non-interest.

The embodiments of the present invention provide a novel control approach, which can support users to conveniently control a display object on a display screen. Note the embodiments of the present invention do not limit the number of areas of interest. For example, the user may be interested in Australia, America and China at the same time, at which point these three areas can be adjacently displayed on a display screen by first hiding the ocean portion between Australia and America (by one or more "fold" operations) and then hiding the area of non-interest between China and Australia (by one or more "fold" operations).

Further note the embodiments of the present invention merely change the appearance of a display object but do not modify the display object per se. In other words, the original image of the map is not modified in the example as illustrated in FIG. 3B. In one embodiment of the present invention, a cancel operation may be performed to the hide operation, i.e., resuming the original image of a map. Alternatively, displayed content may be saved.

Specifically, in one embodiment of the present invention, there is provided a method for controlling a display object on a display screen, comprising: receiving a first interaction between a user and the display screen, wherein a first initial interaction point of the first interaction on the display screen corresponds to a first location in the display object; receiving a second interaction between the user and the display screen, wherein a second initial interaction point of the second interaction on the display screen corresponds to a second location in the display object; and hiding a portion between the first location and the second location in the display object; wherein the portion is defined by a first boundary through the first location, a second boundary through the second location and a boundary of the display object.

Figure 4:
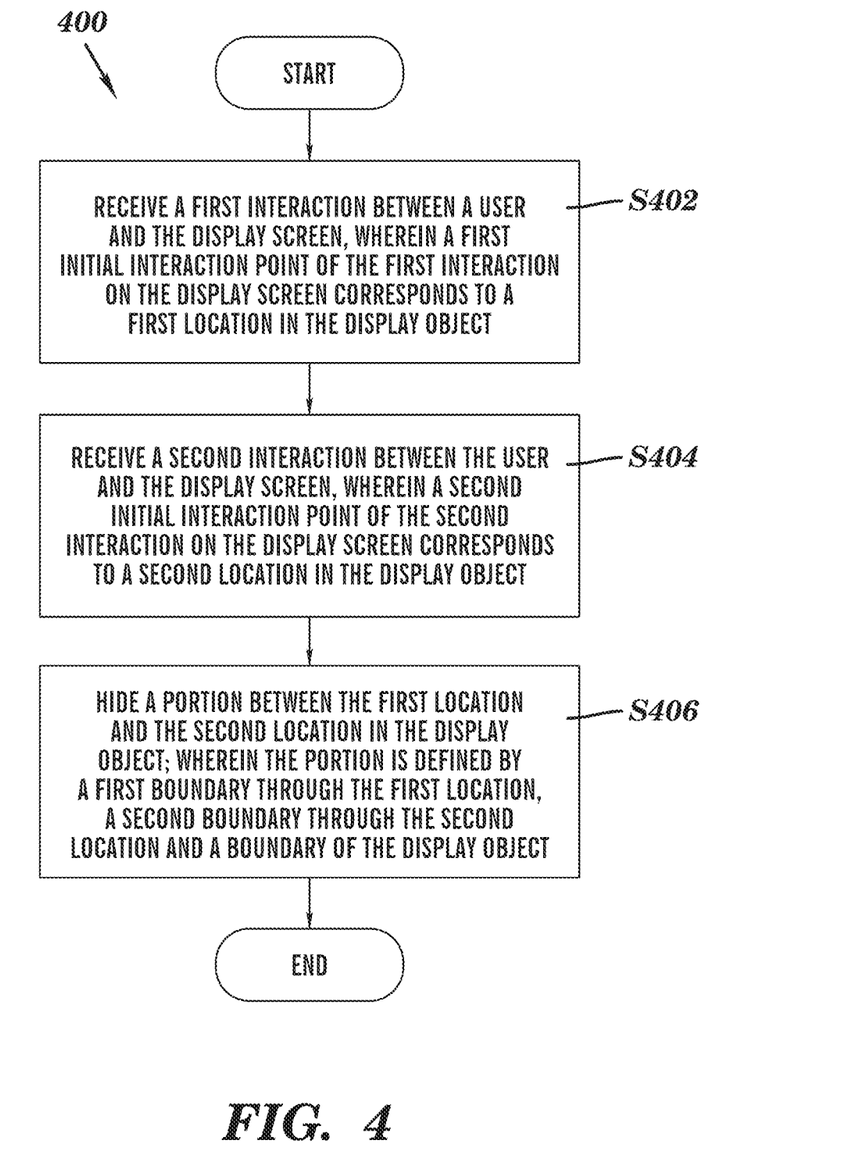
FIG. 4 schematically illustrates a flowchart of a method for controlling a display object on a display screen according to one embodiment of the present invention.

Now with reference to FIG. 4, this figure schematically illustrates a flowchart 400 of a method for controlling a display object on a display screen according to one embodiment of the present invention. First of all, in step S402 a first interaction between a user and the display screen is received, wherein a first initial interaction point of the first interaction on the display screen corresponds to a first location in the display object. Note the "interaction" mentioned here may be the interaction between the user and the display screen, e.g., the user's click, movement (e.g., movement when the left mouse button is pressed) and other operations on an ordinary display screen by using a pointing device, such as a mouse and a track ball, or the user's click or movement on the surface of a touch screen.

Those skilled in the art may understand the "interaction point" may be a "touch point" between the user and the display screen. Where a pointing device like a mouse is used, the "touch point" may be a virtual touch point between a cursor and the display screen; where a touch screen is used, the "touch point" may be a physical touch point between the user's finger and the touch screen. In addition, the interaction point may vary depending on the interaction type. For example, when the interaction is click, the interaction point may be a location of a cursor/finger on the display screen when the user is clicking on the display screen; when the interaction is movement, the interaction point may be a current location of the cursor/finger during interaction.

In this embodiment, a first initial interaction point of the first interaction on the display screen corresponds to a first location in the display object, e.g., first location 310 illustrated in a circle in FIG. 3A. Note the first initial interaction point here refers to an initial "touch point" with the display screen during interaction. For example, when the interaction is click, the initial interaction point may be a location of a cursor/finger on the display screen when the user is clicking on the display screen; when the interaction is movement, the initial interaction point may be an initial touch point between of the cursor/finger and the display screen. In the embodiments of the present invention it is not intended to limit the type of interaction, so long as the interaction can determine a location for defining a boundary of a to-be-hidden area in the display object.

In step S404, a second interaction between the user and the display screen is received, wherein a second initial interaction point of the second interaction on the display screen corresponds to a second location in the display object, e.g., second location 320 illustrated in FIG. 3A. The operation in step S404 is similar to that in step S402; what is different is that step S404 can determine another location for defining the to-be-hidden area. Further note the words "first" and "second" here are not intended to limit the sequence that the two interactions are executed, but to literally distinguish between two interactions that are executed in a successive, simultaneous or temporally overlapping way.

In step S406, a portion between the first location and the second location in the display object is hidden, wherein the portion is defined by a first boundary through the first location, a second boundary through the second location and a boundary of the display object. In this step the first location and the second location may be, for example, first location 310 and second location 320 as illustrated in FIG. 3A, respectively; the first boundary and the second boundary may be as illustrated by two dotted lines in FIG. 3A.

Thus, step 406 determines a first boundary (or line) and a second boundary (or line) in the display object (i.e., image) in the display screen, wherein the first line and the second line respectively pass through the first initial interaction point and the second initial interaction point in the image.

Note in the context of the present invention "hiding" herein may include various meanings, for example, removing the to-be-hidden area from the surface of the display screen (e.g., "folding" the to-be-hidden area), or displaying the to-be-hidden area in a way of occupying less display area, such as displaying the to-be-hidden area with a low resolution, which is similar to "zoom in."

Note in the figures the first boundary and the second boundary are illustrated as straight lines parallel to each other. However, in other embodiments the first boundary and the second boundary may also be straight lines not parallel to each other, at which point the hiding further involves performing other operations of, such as translating and/or rotating at least one portion in the display object.

Note in one embodiment of the present invention, the first boundary and the second boundary may further be limited by the first interaction and the second interaction, respectively. For example, the first boundary and the second boundary are defined (at this point, the boundaries may be straight lines, curves or broken lines) with the tracks of movements of the cursor/finger on the display screen by the user. Where the first boundary and/or the second boundary are not straight line(s), the hiding may further involve translating, rotating and/or stretching at least one portion in the display object.

Note in one embodiment of the present invention, the first boundary may be limited by one of the tracks of the first interaction and the second interaction. For example, the user defines the first boundary by moving the cursor/finger on the display screen. At this point, the second boundary may be limited by a straight line/curve/broken line that goes through the second location and is in completely same shape as the first boundary. At this point, since the first boundary and the second boundary are in completely same shape, when hiding the portion between the first location and the second location in the display object, the display object from which the to-be-hidden portion is removed can perfectly match up.

Further note in one embodiment of the present invention, the to-be-hidden portion is limited by the first boundary through the first location, the second boundary through the second location and the boundary of the display object. The reason for limiting the to-be-hidden portion with the boundary of the display object rather than the boundary of the display screen is that the boundary of the display object may be far larger than that of the display screen. In the example of FIG. 3A, although only the map comprising Australia and surrounding oceanic area is displayed on the display screen, the display object may further comprise all content in the whole world map. Thus, after the portion between dotted lines in FIG. 3A is hidden, the map (comprising those displayed and potentially not displayed in FIG. 3A) and in the upper right of the right dotted line can be translated lower leftwards to cover the hidden area.

In one embodiment of the present invention, the hiding may be executed immediately after the first interaction and the second interaction between the user and the display screen are completed (e.g., the user clicks twice), the hiding may be activated in response to a specific event (e.g., the user presses a specific button) after completion of the interaction, or the hiding may be activated in response to the first and second interactions meeting a specific condition.

In one embodiment of the present invention, the hiding a portion between the first location and the second location in the display object comprises: in response to the second interaction point of the second interaction moving towards the first initial interaction point, hiding the portion between the first location and the second location in the display object. In this embodiment, the second interaction is a move operation. For example, the user may move the cursor/finger towards the first initial interaction point during the second interaction, so as to trigger the hiding step. For another example, where the user is using a touch screen supporting multi-point touch, the user may simultaneously execute the first and second interactions with two fingers, respectively. For example, touch the touch screen with the thumb and index finger simultaneously, and keep the thumb's location unchanged while moving the index finger towards the thumb, so as to trigger "folding" the display object between the thumb and the index finger.

In one embodiment of the present invention, the hiding a portion between the first location and the second location in the display object comprises: in response to the first interaction point of the first interaction and the second interaction point of the second interaction moving towards each other, hiding the portion between the first location and the second location in the display object. Continue the foregoing example of using a multi-point touch screen. Touch the touch screen with the thumb and the index finger simultaneously, and move the thumb and the index finger towards each other ("pinch"), so as to trigger "folding" the display object between the thumb and the index finger.

In one embodiment of the present invention, the hiding a portion between the first location and the second location in the display object comprises: displaying the portion between the first location and the second location in the display object with lower resolution. Specifically, the to-be-hidden area may be compressed in a specific direction. For example, the to-be-hidden area may be "squeezed" (e.g., "compressed" to ⅕ of the original size) along the direction from the first location to the second location. In this way, the display area of the to-be-hidden area may be reduced to a certain extent, so that multiple areas of interest may be simultaneously displayed on the display screen.

In one embodiment of the present invention, the hiding a portion between the first location and the second location in the display object comprises: calculating a direction between the first location and the second location; determining the first boundary and the second boundary based on the direction; and hiding a strip between the first boundary and the second boundary in the display object.

Specifically, how to implement the hiding step is described with reference to the location relationships illustrated in FIG. 5. This figure schematically illustrates a schematic view 500 of dividing a display object or image 505 on a display screen according to one embodiment of the present invention. As described above, the first boundary and the second boundary may be straight lines that respectively go through the first location and the second location and are either parallel or not parallel to each other, or curves/broken lines that are defined by the tracks of the first interaction and the second interaction respectively. For the purpose of convenience, detailed illustration is presented below in the case that the first boundary and the second boundary are both straight lines only. Those skilled in the art may devise and implement other embodiments based on principles to be described below.

Figure 5:
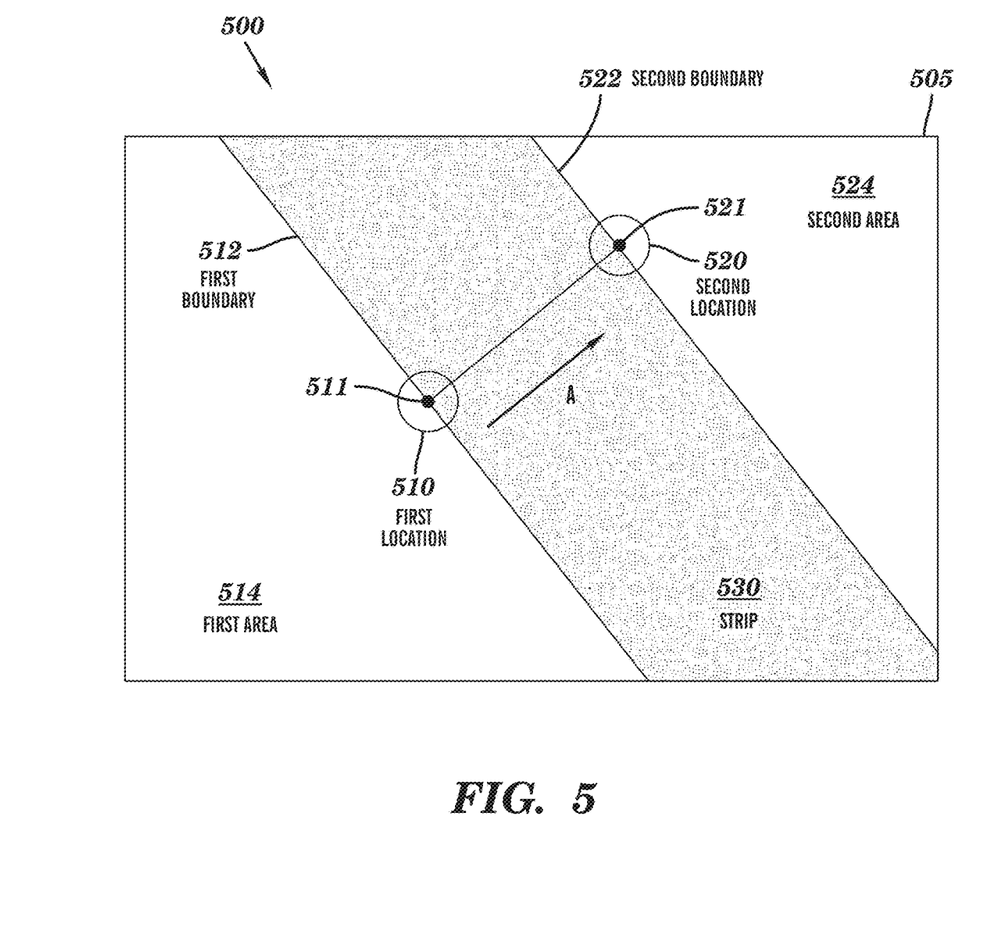
FIG. 5 schematically illustrates a schematic view of dividing a display object on a display screen according to one embodiment of the present invention.

As illustrated in FIG. 5, first of all, a direction A between a first location 510 (x1, y1) and a second location 520 (x2, y2) may be calculated, e.g., through coordinates of the first location and the second location. Next, a first boundary or line 512 and a second boundary or line 522 are determined based on the direction A. For example, first boundary 512 and second boundary 522 may be perpendicular to the direction A and thus parallel to each other in the embodiment of FIG. 5. However, in other embodiments, the first boundary 512 and the second boundary 522 may be not be parallel to each other. Moreover, the first boundary 512 and the second boundary 522 are straight lines in the embodiment of FIG. 5, but may have curvature, and thus not be straight lines, in other embodiments regardless of whether or not the boundaries 512 and 522 are parallel to each other. Finally, a strip or strip area 530 (a shadow area between first boundary 512 and second boundary 522 is strip 530 that is to be hidden) between first boundary 512 and second boundary 522 in the display object or image 505 may be hidden.

For the convenience of further description, the display object may be divided into several portions by first boundary 512 and second boundary 522, which are called a first area 514, strip or strip area 530 and a second area 524 successively. Although, within the scope of the display screen, only portions of first area 514, strip 530 and second area 524 are illustrated in FIG. 5, the areas and strip may further include portions outside the scope of the display screen, which may be moved into the scope of the display screen through translate operation.

In FIG. 5, step 406 (see FIG. 4) determines a first boundary (or line) 512 and a second boundary (or line) 522 in the display object (i.e., image) 505 in the display screen. The first line 512 and the second line 522 in the image 505 respectively pass through a first interaction point 511 (within the first location 510) and a second interaction point 521 (within the second location 520) in the image 505. The first line 512 and the second line 522 divide the image 505 into a first area 514, a strip area 530, and a second area 524. The first area 514 is in direct physical contact with the strip area 530 along the first line 512. The second area 524 is in direct physical contact with the strip area 530 along the second line 522. The strip area 530 is disposed between, and in direct physical contact with, the first line 512 and the second line 522.

In one embodiment of the present invention, the hiding a strip between the first boundary and the second boundary in the display object comprises: translating portions outside the strip in the display object so as to cover the strip. The purpose of hiding the strip is to remove from the display screen the display object that is located within the strip. Thus, areas outside the strip may be translated and then cover the strip, so as to achieving the effect of hiding.

In one embodiment of the present invention, the translating portions outside the strip in the display object so as to cover the strip comprises: translating at least one of a first area and a second area in the display object to cover the strip, wherein the first boundary and the second boundary divides the display object into the first area, the strip and the second area successively.

The meanings of the first area and the second area have been explained above with reference to FIG. 5. Those skilled in the art may understand by translating the first area and/or the second area, the boundaries of the first area and the second area are pieced together, and further the effect of hiding the strip is achieved. Based on concrete implementation, the user may specify only the first area is translated, only the second area is translated, or both the first area and the second area are translated.

In one embodiment of the present invention, when the second area is translated, translated coordinate offsets of the second area are coordinate differences between the second interaction point and the second initial interaction point of the second interaction.

Figure 6:
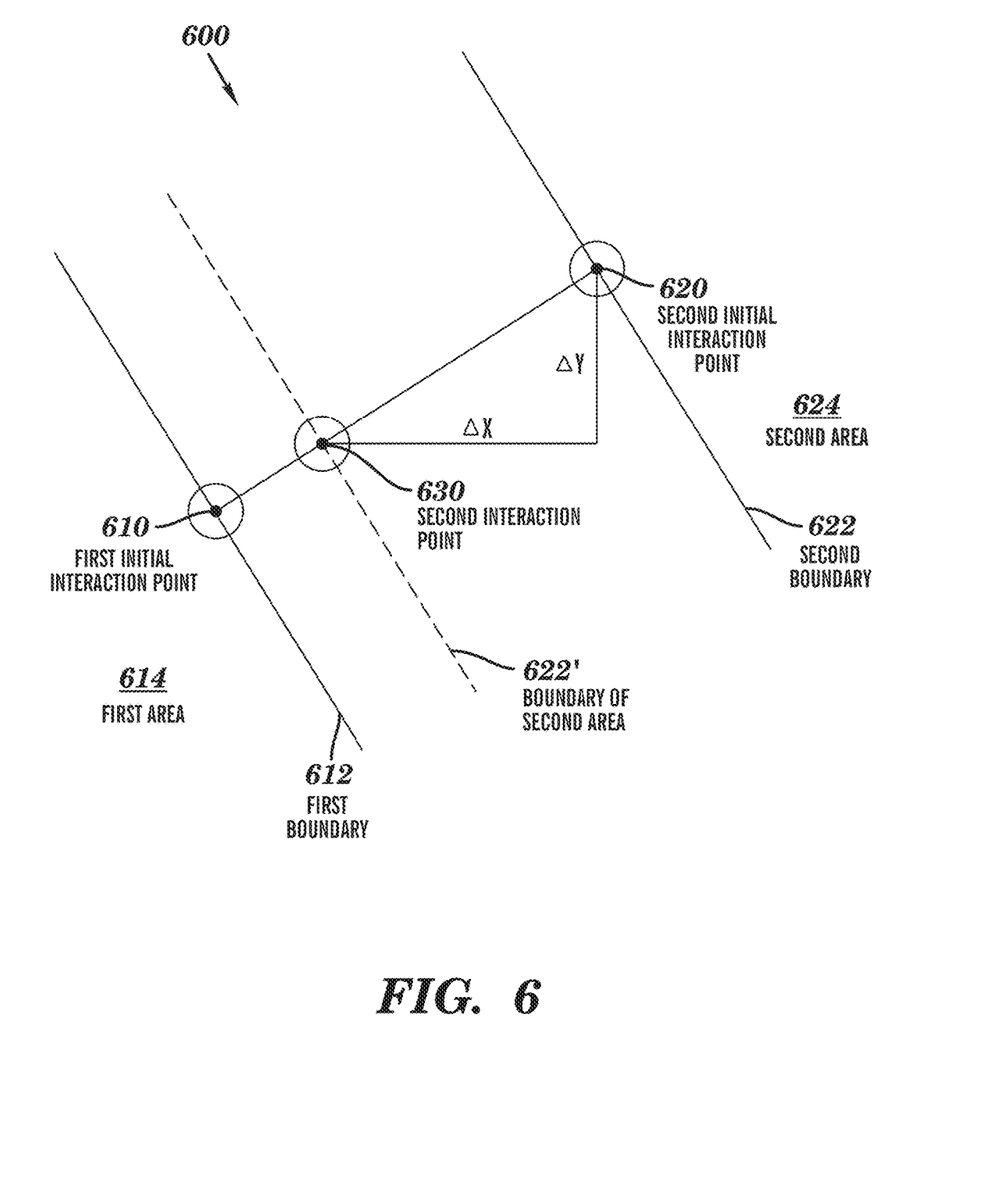
FIG. 6 schematically illustrates a schematic view of translating at least one area in a display object according to one embodiment of the present invention.

Specifically, FIG. 6 schematically illustrates a schematic view 600 of translating at least one area of the display object according to one embodiment of the present invention. This figure illustrates a first initial interaction point 610, a second initial interaction point 620, a first boundary 612, a second boundary 622, a first area 614, a second area 624, and a second interaction point 630. In this embodiment, second interaction point 630 refers to a touch point between the user and the display screen during the second interaction (e.g., the cursor/finger moves on the surface of the display screen).

In this embodiment, while second interaction 630 moves towards the first initial interaction point (e.g., in the foregoing example of a multi-point touch screen, the user's thumb at the first initial interaction point 610 stays still while the index finger at the second interaction point 630 moves towards the thumb), the second area 624 may be dynamically translated as the user's index finger moves. At this point, the boundary of second area 624 may gradually extend from second boundary 622 to the place illustrated by a dotted line 622'. As illustrated in this figure, the offsets of the index finger are ($\Delta x$, $\Delta y$), and with respect to each pixel point in the second area, the index finger may be translated by a distance of ($\Delta x$, $\Delta y$). In other words, translated coordinate offsets of the second area are coordinate differences between the second interaction point and the second initial interaction point of the second interaction.

In one embodiment of the present invention, when the first area is translated, translated coordinate offsets of the first area are coordinate differences between the first interaction point and the first initial interaction point of the first interaction.

This embodiment is similar to the example illustrated with reference to FIG. 6, except that respective current interaction points of the first interaction and the second interaction may move towards each other (for example, in the foregoing example of a multi-point touch screen, the user's thumb at the first initial interaction point 610 and index finger at the second interaction point 630 move towards each other), the first area may be dynamically translated as the user's thumb moves, and meanwhile the second area may be dynamically translated as the user's index finger moves.

With reference to the coordinates illustrated in FIG. 6, those skilled in the art may implement, by themselves, translation with reference to the first area and the second area. Specifically, offsets of the thumb may be ($\Delta x1$, $\Delta y1$), and with respect to each pixel point in the first area, each pixel may be translated by a distance of ($\Delta x1$, $\Delta y1$); offsets of the index finger may be ($\Delta x2$, $\Delta y2$), and with respect to each pixel point in the second area, each pixel may be translated by a distance of ($\Delta x2$, $\Delta y2$). In other words, translated coordinate offsets of the first area are coordinate differences between the first interaction point and the first initial interaction point of the first interaction, and translated coordinate offsets of the second area are coordinate differences between the second interaction point and the second initial interaction point of the second interaction.

In this way, the first area and the second area may be "meshed" together. Or, the strip is hidden directly and the first area and the second area are pieced together, omitting dynamic translation.

In one embodiment of the present invention, the first boundary and the second boundary are perpendicular to directions determined by the first location and the second location, respectively. Although the foregoing boundaries are perpendicular to direction determined by the first location and the second location, respectively, those skilled in the art may understand either of the first boundary and the second boundary may not be perpendicular to the direction; or the first boundary and the second boundary may be in the form of straight lines, curves or broken lines, so long as the first boundary and the second boundary can limit the to-be-hidden area. The first boundary and the second boundary may be defined with the tracks of movements of the cursor/finger on the display screen by the user.

In embodiments in which the first and second boundaries are parallel to each other, the user may define the first boundary by moving the cursor/finger on the display screen from the first initial interaction point as a straight line/curve/broken line. Then the second boundary may be determined to be a straight line/curve/broken line that goes through the second location (i.e., second interaction point) and is the same shape as the first boundary.

In embodiments in which the first and second boundaries are not parallel to each other, the user may define the first boundary by moving the cursor/finger on the display screen from the first initial interaction point as a straight line/curve/broken line, and the user may define the second boundary by moving the cursor/finger on the display screen from the second initial interaction point as a straight line/curve/broken line that is not parallel to the first boundary.

In one embodiment of the present invention, the display object may be any one of an image object and a portable document format object. Various embodiments of the present invention do not limit the type of an application providing the display object, but the application may, for example, include without limitation a map application, an image browse application, an image processing application, a browser, etc.

Figure 7:
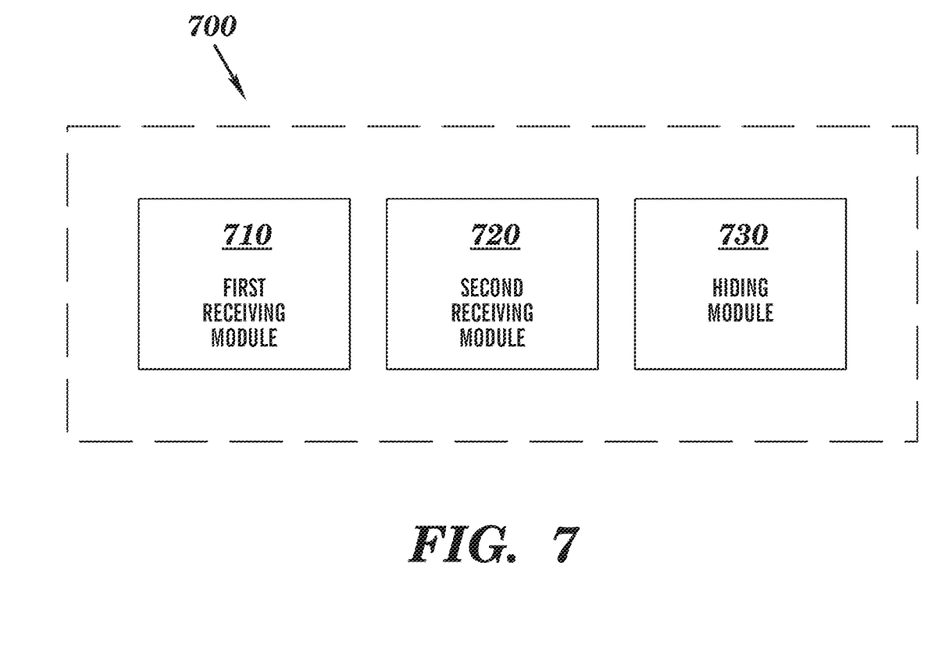
FIG. 7 schematically illustrates a block diagram of an apparatus for controlling a display object on a display screen according to one embodiment of the present invention.

FIG. 7 schematically illustrates a block diagram 700 of an apparatus for controlling a display object on a display screen. In FIG. 7, there is provided an apparatus for controlling a display object on a display screen, comprising: a first receiving module 710 configured to receive a first interaction between a user and the display screen, wherein a first initial interaction point of the first interaction on the display screen corresponds to a first location in the display object; a second receiving module 720 configured to receive a second interaction between the user and the display screen, wherein a second initial interaction point of the second interaction on the display screen corresponds to a second location in the display object; and a hiding module 730 configured to hide a portion between the first location and the second location in the display object; wherein the portion is defined by a first boundary through the first location, a second boundary through the second location and a boundary of the display object.

In one embodiment of the present invention, hiding module 730 comprises: a first hiding module configured to fold the portion in response to the second interaction point of the second interaction moving towards the first initial interaction point.

In one embodiment of the present invention, hiding module 730 comprises: a second hiding module configured to fold the portion in response to the first interaction point of the first interaction and the second interaction point of the second interaction moving towards each other.

In one embodiment of the present invention, hiding module 730 comprises: a displaying module configured to display the portion between the first location and the second location in the display object with lower resolution.

In one embodiment of the present invention, hiding module 730 comprises: a calculating module configured to calculate a direction between the first location and the second location; a determining module configured to determine the first boundary and the second boundary based on the direction; and a strip hiding module configured to hide a strip between the first boundary and the second boundary in the display object.

In one embodiment of the present invention, strip hiding module further comprises: a translating module configured to translate portions outside the strip in the display object so as to cover the strip.

In one embodiment of the present invention, the translating module comprises: an area translating module configured to translate at least one of a first area and a second area in the display object to cover the strip, wherein the first boundary and the second boundary divides the display object into the first area, the strip and the second area successively.

In one embodiment of the present invention, wherein translated coordinate offsets of the second area are coordinate differences between the second interaction point and the second initial interaction point of the second interaction.

In one embodiment of the present invention, translated coordinate offsets of the first area are coordinate differences between the first interaction point and the first initial interaction point of the first interaction.

In one embodiment of the present invention, the first boundary and the second boundary are perpendicular to the direction, respectively.

In one embodiment of the present invention, the display object is any of an image object and a portable document format object.

Note the user may take various approaches to enter the control mode as described in the present invention. For example, the user may make interaction on the display screen in normal mode, and enter control mode when the interaction track meets a predefined track (e.g., a circle, a triangle or other predetermined shape). In one embodiment, techniques like trajectory analysis may be used to compare whether the user's interaction track matches a predefined track, which is not detailed in this specification. In addition, the user may enter the control mode by pressing a predetermined button. Furthermore, the user may exit the control mode when necessary, i.e., return to normal input mode.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for modifying display of an image on a display screen, said method comprising:
   displaying an original image on the display screen;
   while the original image is being displayed on the display screen, receiving, by one or more processors of a computer system, a selection of a first point in the original image on the display screen, said first point having been selected by the user using a cursor or a finger of the user on the display screen to identify the first point in the original image;
   while the original image is being displayed on the display screen, receiving, by the one or more processors, a selection of a second point in the original image on the display screen, said second point having been selected by the user using the cursor or the finger of the user on the display screen to identify the second point in the original image;
   after said receiving the first point and the second point, generating on the display screen, by the one or more processors, a first line and a second line in the original image respectively passing through the first point and the second point in the original image, wherein the generated first line and the generated second line visibly define a strip area, a first area, and a second area on the display screen by dividing the original image into the first area, the strip area, and the second area on the display screen, wherein the first area is in direct physical contact with the strip area along the first line, wherein the second area is in direct physical contact with the strip area along the second line, wherein the strip area is disposed between, and in direct physical contact with, the first line and the second line, wherein the first area, the strip area, the second area, the first line, and the second line are being visibly displayed on the display screen as a composite image, wherein the original image encompasses the first area, the strip area, and the second area, wherein first area, the strip area, and the second area are not visibly defined in the original image on the display screen prior to said generating the first line and the second line, wherein the original image and the composite image have a same area and are displayed in an identical area of the composite image, wherein the composite image comprises a closed exterior boundary, and wherein the first line and the second line are each oriented at an acute angle or at an obtuse angle with the closed exterior boundary of the composite image; and
   after said generating, hiding, by the one or more processors, a portion of the strip area, wherein said hiding comprises either removing the visibility of the strip area from the display screen or displaying the portion of the strip area on the display screen in lower resolution than before said hiding is performed, and wherein all geometric areas within the original image appear unmagnified and uncompressed in the composite image prior to said hiding.

2. The method of claim 1, said method further comprising:
   detecting, by the one or more processors, a motion of a cursor or a finger of the user on the display screen along a path from the second point toward the first point and ending at a point on the path to define a third line on the display screen passing through the point on the path and being parallel to the second line, wherein the portion of the strip area is disposed between, and in direct physical contact with, the first line and the third line.

3. The method of claim 1, said method further comprising:
   detecting, by the one or more processors, a motion of a cursor or a first finger of the user on the display screen along a first path from the second point toward the first point and ending at a point on the first path to define a third line on the display screen passing through the point on the first path and being parallel to the second line;
   detecting, by the one or more processors, a motion of the cursor or a second finger of the user on the display screen along a second path from the first point toward the second point and ending at a point on the second path to define a fourth line on the display screen passing through the point on the second path and being parallel to the first line, wherein the portion of the strip area is disposed between, and in direct physical contact with, the third line and the fourth line.

4. The method of claim 1, wherein said hiding comprises removing the visibility of the portion of the strip area from the display screen by translating a portion of the first area, a portion of the second area, or both the portion of the first area and the portion of the second area toward the portion of the strip area to cover the portion of the strip area.

5. The method of claim 1, wherein said determining the first line and the second line comprises:
  detecting a motion of a cursor or a finger of the user on the display screen along a first path from the first point and in response, determining that the first line is the first path; and
  determining the second line as being parallel to the first line.

6. The method of claim 1, wherein said determining the first line and the second line comprises:
  detecting a motion of a cursor or a finger of the user on the display screen along a first path from the first point and in response, determining that the first line is the first path; and
  detecting a motion of a cursor or a finger of the user on the display screen along a second path from the second point and in response, determining that the second line is the second path.

7. The method of claim 1, wherein said determining the first line and the second line comprises:
  determining a direction from the first point to the second point; and
  determining the first line and the second line based on the direction.

8. The method of claim 7, wherein the first line and the second line are each perpendicular to the direction.

9. The method of claim 7, wherein the first line and the second line are not parallel to each other.

10. The method of claim 7, wherein the first line, the second line, or both the first line and the second line are curved and not a straight line.

11. The method of claim 7, wherein the first line is a first straight line and the second line a second straight line.

12. A computer program product comprising one or more computer readable storage devices storing computer readable program code, said program code containing instructions which, upon being executed by one or more processors of a data processing system, implement a method for filtering content received from a search of information, said method comprising:
  displaying an original image on the display screen;
  while the original image is being displayed on the display screen, receiving, by one or more processors of a computer system, a selection of a first point in the original image on the display screen, said first point having been selected by the user using a cursor or a finger of the user on the display screen to identify the first point in the original image;
  while the original image is being displayed on the display screen, receiving, by the one or more processors, a selection of a second point in the original image on the display screen, said second point having been selected by the user using the cursor or the finger of the user on the display screen to identify the second point in the original image;
  after said receiving the first point and the second point, generating on the display screen, by the one or more processors, a first line and a second line in the original image respectively passing through the first point and the second point in the original image, wherein the generated first line and the generated second line visibly define a strip area, a first area, and a second area on the display screen by dividing the original image into the first area, the strip area, and the second area on the display screen, wherein the first area is in direct physical contact with the strip area along the first line, wherein the second area is in direct physical contact with the strip area along the second line, wherein the strip area is disposed between, and in direct physical contact with, the first line and the second line, wherein the first area, the strip area, the second area, the first line, and the second line are being visibly displayed on the display screen as a composite image, wherein the original image encompasses the first area, the strip area, and the second area, wherein first area, the strip area, and the second area are not visibly defined in the original image on the display screen prior to said generating the first line and the second line, wherein the original image and the composite image have a same area and are displayed in an identical area of the composite image, wherein the composite image comprises a closed exterior boundary, and wherein the first line and the second line are each oriented at an acute angle or at an obtuse angle with the closed exterior boundary of the composite image; and
  after said generating, hiding, by the one or more processors, a portion of the strip area, wherein said hiding comprises either removing the visibility of the strip area from the display screen or displaying the portion of the strip area on the display screen in lower resolution than before said hiding is performed, and wherein all geometric areas within the original image appear unmagnified and uncompressed in the composite image prior to said hiding.

13. The computer program product of claim 12, said method further comprising:
  detecting, by the one or more processors, a motion of a cursor or a finger of the user on the display screen along a path from the second point toward the first point and ending at a point on the path to define a third line on the display screen passing through the point on the path and being parallel to the second line, wherein the portion of the strip area is disposed between, and in direct physical contact with, the first line and the third line.

14. The computer program product of claim 12, said method further comprising:
  detecting, by the one or more processors, a motion of a cursor or a first finger of the user on the display screen along a first path from the second point toward the first point and ending at a point on the first path to define a third line on the display screen passing through the point on the first path and being parallel to the second line;
  detecting, by the one or more processors, a motion of the cursor or a second finger of the user on the display screen along a second path from the first point toward the second point and ending at a point on the second path to define a fourth line on the display screen passing through the point on the second path and being parallel to the first line, wherein the portion of the strip area is disposed between, and in direct physical contact with, the third line and the fourth line.

15. The computer program product of claim 12, wherein said hiding comprises removing the visibility of the portion of the strip area from the display screen by translating a portion of the first area, a portion of the second area, or both the portion of the first area and the portion of the second area toward the portion of the strip area to cover the portion of the strip area.

16. The computer program product of claim 12, wherein said determining the first line and the second line comprises:
- detecting a motion of a cursor or a finger of the user on the display screen along a first path from the first point and in response, determining that the first line is the first path; and
- determining the second line as being parallel to the first line.

17. A computer system comprising one or more processors, one or more memory units, and one or more computer readable storage devices, wherein the one or more storage device contain program code which, upon being executed by the one or more processors via the one or more memory units, implement a method for filtering content received from a search of information, said method comprising:
- displaying an original image on the display screen;
- while the original image is being displayed on the display screen, receiving, by one or more processors of a computer system, a selection of a first point in the original image on the display screen, said first point having been selected by the user using a cursor or a finger of the user on the display screen to identify the first point in the original image;
- while the original image is being displayed on the display screen, receiving, by the one or more processors, a selection of a second point in the original image on the display screen, said second point having been selected by the user using the cursor or the finger of the user on the display screen to identify the second point in the original image;
- after said receiving the first point and the second point, generating on the display screen, by the one or more processors, a first line and a second line in the original image respectively passing through the first point and the second point in the original image, wherein the generated first line and the generated second line visibly define a strip area, a first area, and a second area on the display screen by dividing the original image into the first area, the strip area, and the second area on the display screen, wherein the first area is in direct physical contact with the strip area along the first line, wherein the second area is in direct physical contact with the strip area along the second line, wherein the strip area is disposed between, and in direct physical contact with, the first line and the second line, wherein the first area, the strip area, the second area, the first line, and the second line are being visibly displayed on the display screen as a composite image, wherein the original image encompasses the first area, the strip area, and the second area, wherein first area, the strip area, and the second area are not visibly defined in the original image on the display screen prior to said generating the first line and the second line, wherein the original image and the composite image have a same area and are displayed in an identical area of the composite image, wherein the composite image comprises a closed exterior boundary, and wherein the first line and the second line are each oriented at an acute angle or at an obtuse angle with the closed exterior boundary of the composite image; and
- after said generating, hiding, by the one or more processors, a portion of the strip area, wherein said hiding comprises either removing the visibility of the strip area from the display screen or displaying the portion of the strip area on the display screen in lower resolution than before said hiding is performed, and wherein all geometric areas within the original image appear unmagnified and uncompressed in the composite image prior to said hiding.

18. The computer system of claim 17, wherein said determining the first line and the second line comprises:
- detecting a motion of a cursor or a finger of the user on the display screen along a first path from the first point and in response, determining that the first line is the first path; and
- detecting a motion of a cursor or a finger of the user on the display screen along a second path from the second point and in response, determining that the second line is the second path.

19. The computer system of claim 17, wherein said determining the first line and the second line comprises:
- determining a direction from the first point to the second point; and
- determining the first line and the second line based on the direction.

20. The computer system of claim 19, wherein the first line and the second line are each perpendicular to the direction.

* * * * *